(12) United States Patent
Chaturvedi (10) Patent No.: US 12,454,124 B2
(45) Date of Patent: Oct. 28, 2025

(54) METHOD OF MAKING ZIPPER POUCH (71) Applicant: Dow Global Technologies LLC, Midland, MI (US)

(72) Inventor: Prem K. Chaturvedi, Juinagar (IN)

(73) Assignee: Dow Global Technologies LLC, Midland, MI (US)

( * ) Notice: Subject to any disclaimer, the term of this patent is extended or adjusted under 35 U.S.C. 154(b) by 139 days.

(21) Appl. No.: 17/756,539

(22) PCT Filed: Nov. 9, 2020

(86) PCT No.: PCT/US2020/059609
§ 371 (c)(1),
(2) Date: May 26, 2022

(87) PCT Pub. No.: WO2021/133475
PCT Pub. Date: Jul. 1, 2021

(65) Prior Publication Data
US 2022/0410552 A1 Dec. 29, 2022

(30) Foreign Application Priority Data
Dec. 23, 2019 (IN) .............. 201941053396

(51) Int. Cl.
*B32B 37/12* (2006.01)
*B29C 65/00* (2006.01)
(Continued)

(52) U.S. Cl.
CPC .............. *B32B 37/12* (2013.01); *B29C 65/02* (2013.01); *B29C 65/485* (2013.01); *B29C 66/45* (2013.01);
(Continued)

(58) Field of Classification Search
CPC ........... B32B 37/12; B32B 7/12; B32B 27/08; B32B 27/32; B32B 27/36; B32B 2250/24;
(Continued)

(56) References Cited

U.S. PATENT DOCUMENTS 6,846,532 B1    1/2005  Bensur
10,155,890 B2 * 12/2018 Vietti .................. C08G 18/797
(Continued)

FOREIGN PATENT DOCUMENTS

CA     3008034 A1   7/2017
CN     1277894 C    10/2006
(Continued)

OTHER PUBLICATIONS

Dow "A State-of-the-Art Medium Performance Solvent Free Adhesive Solution for Flexible Packaging Packaging and Specialty Plastics," 2017, p. 1-2.
(Continued)

*Primary Examiner* — Alex B Efta
*Assistant Examiner* — Alexander S Wright
(74) *Attorney, Agent, or Firm* — Boyle Fredrickson S.C.

(57) ABSTRACT

Provided is a process for preparing a zipper pouch, wherein the process comprises: A) forming a first laminate by a process comprising i) bringing together a polyisocyanate component and a polyol component to form an adhesive composition, ii) applying a layer of the adhesive composition to a layer of polyethylene terephthalate, iii) then contacting the layer of the adhesive composition with a layer of polyethylene having thickness of 80 micrometer or more; B) contacting a polymeric zipper construction to the first laminate at temperature of 200 C or higher. Also provided is a zipper pouch made by that process.

15 Claims, 2 Drawing Sheets

(51) Int. Cl.
| | |
|---|---|
| *B29C 65/02* | (2006.01) |
| *B29C 65/48* | (2006.01) |
| *B29K 623/00* | (2006.01) |
| *B29K 667/00* | (2006.01) |
| *B29L 31/00* | (2006.01) |
| *B32B 7/12* | (2006.01) |
| *B32B 27/08* | (2006.01) |
| *B32B 27/32* | (2006.01) |
| *B32B 27/36* | (2006.01) |
| *B65D 33/25* | (2006.01) |
| *C08J 5/12* | (2006.01) |
| *C09J 5/00* | (2006.01) |
| *C09J 175/04* | (2006.01) |

(52) U.S. Cl.
CPC ........ *B29C 66/4722* (2013.01); *B29C 66/712* (2013.01); *B32B 7/12* (2013.01); *B32B 27/08* (2013.01); *B32B 27/32* (2013.01); *B32B 27/36* (2013.01); *B65D 33/2508* (2013.01); *C08J 5/125* (2013.01); *C09J 5/00* (2013.01); *C09J 175/04* (2013.01); *B29K 2623/06* (2013.01); *B29K 2667/003* (2013.01); *B29K 2995/0017* (2013.01); *B29L 2031/7128* (2013.01); *B32B 2250/24* (2013.01); *B32B 2307/306* (2013.01); *B32B 2307/31* (2013.01); *B32B 2307/732* (2013.01); *B32B 2323/04* (2013.01); *B32B 2367/00* (2013.01); *B32B 2439/46* (2013.01); *B32B 2439/70* (2013.01); *C08J 2323/06* (2013.01); *C08J 2367/02* (2013.01); *C08J 2475/04* (2013.01); *C09J 2423/048* (2013.01); *C09J 2467/008* (2013.01); *C09J 2475/00* (2013.01)

(58) Field of Classification Search
CPC .......... B32B 2307/306; B32B 2307/31; B32B 2307/732; B32B 2323/04; B32B 2367/00; B32B 2439/46; B32B 2439/70; B29C 65/02; B29C 65/485; B29C 66/45; B29C 66/4722; B29C 66/712; B65D 33/2508; C08J 5/125; C08J 2323/06; C08J 2367/02; C08J 2475/04; C09J 5/00; C09J 175/04; C09J 2423/048; C09J 2467/008; C09J 2475/00; C09J 18/10; C09J 18/5084; C09J 18/4684; B29K 2623/06; B29K 2667/003; B29K 2995/0017; B29L 2031/7128
See application file for complete search history.

(56) References Cited

U.S. PATENT DOCUMENTS

| | | | |
|---|---|---|---|
| 10,450,106 | B2 | 10/2019 | Namba |
| 2010/0119821 | A1* | 5/2010 | Uemura ................. B32B 27/38 |
| | | | 427/207.1 |
| 2018/0086508 | A1* | 3/2018 | Namba ................. B32B 27/32 |
| 2019/0390094 | A1 | 12/2019 | Wu et al. |
| 2021/0024794 | A1 | 1/2021 | Xie et al. |

FOREIGN PATENT DOCUMENTS

| | | | | |
|---|---|---|---|---|
| CN | 102174308 | B | 9/2011 | |
| IN | 307034 | B | 2/2019 | |
| JP | 2002155260 | A | 5/2002 | |
| JP | 2007-022558 | A | 2/2007 | |
| JP | 2011-162656 | A | 8/2011 | |
| JP | 2018-027658 | A | 2/2018 | |
| WO | 2012/054922 | A2 | 4/2012 | |
| WO | WO-2015125160 | A1 * | 8/2015 | ............ B32B 27/08 |
| WO | 2019/045868 | A1 | 3/2019 | |
| WO | 2019/188335 | A1 | 10/2019 | |

OTHER PUBLICATIONS

PCT/US2020/059609, International Search Report and Written Opinion with a mailing date of Mar. 1, 2021.
Link to bostik laminating adhesives solventless packaging Document : https://www.chempoint.com/insights/bostik-laminating-adhesives-solventless-packaging.

* cited by examiner

METHOD OF MAKING ZIPPER POUCH

A desirable container for packaging food is the zipper pouch, which has a closure construction (called the "zipper") that can be sealed by applying pressure with the fingers, then opened by hand, and then closed again by applying pressure with the fingers. The side of the body of the zipper pouch is a polymeric laminate, and the zipper construction is also made of one or more polymers. The zipper construction is attached to the side of the body of the pouch by applying pressure at relatively high temperature.

The process of attaching the zipper construction to the body of the pouch, because of the high temperature involved, often damages the laminate that makes up the sides of the body of the pouch, for example by causing wrinkling and/or blistering. Such damage can sometimes be avoided when the laminate had been formed by binding the layers together with a high-performance adhesive composition that has unusually good heat resistance. In the past, many of such high-performance adhesives were solvent based; that is, the adhesives, when applied to a substrate, were in the form of a solution in an organic solvent. The use of such solvents causes problems, such as, for example, release of volatile organic compounds (VOCs) and/or difficulties, such as increased cost and/or lower productivity, that arise from employing methods to restrict the release of VOCs.

WO 2015/125160 describes a pouch for carrying water that is made of a laminate, which in turn is made of a layer of polyethylene terephthalate (PET), which is adhered to a layer of a polyolefin polymer using an adhesive composition, which may be solventless.

It is desired to provide a method of making a zipper pouch made from a laminate, where the method avoids the use of solvent in making the laminate, and where the laminate resists damage from the process of attaching the zipper construction to the laminate.

The following is a statement of the invention.

A first aspect of the present invention is a process for preparing a zipper pouch, wherein the process comprises
A) forming a first laminate by a process comprising
   i) bringing together a polyisocyanate component and a polyol component to form an adhesive composition, wherein the polyisocyanate component comprises a polyisocyanate prepolymer, and
   wherein the polyol component comprises a phosphate functional compound,
   wherein the adhesive composition comprises zero to 10% by weight, based on the weight of the adhesive composition, of solvent,
   wherein the adhesive composition comprises zero to 0.01% by weight, based on the weight of the adhesive composition, of silane compounds,
   ii) applying a layer of the adhesive composition to a layer of polyethylene terephthalate,
   iii) then contacting the layer of the adhesive composition with a layer of polyethylene having thickness of 80 micrometer or more,
B) contacting a polymeric zipper construction to the first laminate at temperature of 200° C. or higher.

A second aspect of the present invention is a zipper pouch made by the process of the first aspect of the present invention.

The following is a brief description of the drawings.

The following is a detailed description of the invention.

As used herein, the following terms have the designated definitions, unless the context clearly indicates otherwise.

As used herein, an isocyanate is any compound that contains two or more isocyanate groups. An isocyanate monomer is an isocyanate that has molecular weight of 550 or less. An aromatic isocyanate is an isocyanate that contains one or more aromatic rings. An aliphatic isocyanate contains no aromatic rings.

As used herein, a polyol is a compound having two or more hydroxyl groups. A polyol having exactly two hydroxyl groups is a diol, and a polyol having exactly three hydroxyl groups is a triol. The functionality of a polyol is the number of hydroxyl groups per molecule, denoted by the letter "f." A polyester polyol is a polyol having two or more ester linkages. A polyether polyol is a polyol having two or more ether linkages. A polyesterpolyether polyol is a polyol having both two or more ester linkages and two or more ether linkages. A polyester polyol or polyether polyol often exists as a mixture of several compounds. The molecular weight of such a mixture is the number-average molecular weight, and the functionality of such a mixture is the number-average functionality.

Compounds having isocyanate groups may be characterized by the parameter "% NCO," which is the amount of isocyanate groups by weight based on the weight of the compound. The parameter % NCO is measured by the method of ASTM D 2572-97(2010).

A polymer is a molecule having number-average molecular weight of 10,000 dalton or higher. A polymer is made of bonded smaller units known as the polymerized units of monomers. A polymer may be a homopolymer, in which all the polymerized units are the same, or may be a copolymer, in which there are two or more different types of polymerized units. Polymers may be linear, branched, crosslinked, or a combination thereof.

Polyethylene is a polymer that contains 75% or more by weight, based on the weight of the polymer, of polymerized units of ethylene, as shown in structure I:

Polyethylene terephthalate is a polymer that contains 50% or more by weight, based on the weight of the polymer, polymerized units that have the structure of a monoester of terephthalic acid and ethylene glycol, as shown in structure II:

A phosphate functional compound is a compound having structure III:

where R is any atom or group of atoms, including, for example, hydrogen, an organic group, an inorganic group, or any combination thereof.

A "film" is any structure that is 0.5 mm or less in one dimension and is 1 cm or more in both of the other two dimensions. A polymer film is a film that is made of a polymer or mixture of polymers.

Ratios presented herein are characterized as follows. For example, if a ratio is said to be 3:1 or greater, that ratio may be 3:1 or 5:1 or 100:1 but may not be 2:1. This characterization may be stated in general terms as follows. When a ratio is said herein to be X:1 or greater, it is meant that the ratio is Y:1, where Y is greater than or equal to X. For another example, if a ratio is said to be 15:1 or less, that ratio may be 15:1 or 10:1 or 0.1:1 but may not be 20:1. In general terms, when a ratio is said herein to be W:1 or less, it is meant that the ratio is Z:1, where Z is less than or equal to W.

The present invention involves the use of an isocyanate component. The isocyanate component contains one or more isocyanate prepolymer that is the reaction product of reactants (the "prepolymer reactants") comprising at least one isocyanate monomer and at least one polyol. The at least one polyol contains one or more polyols that are selected from the group consisting of one or more polyester polyols, one or more polyether polyols, one or more polyetherpolyester polyols, and one or more mixtures thereof.

Isocyanate monomer suitable for use in the prepolymer reactants can be selected from the group consisting of aromatic isocyanates, aliphatic isocyanates, and/or combinations thereof. Examples of aromatic isocyanates suitable for use according to this disclosure include, but are not limited to, isomers of methylene diphenyl dipolyisocyanate ("MDI"), such as 4, 4-MDI, 2, 4-MDI and 2,2'-MDI, or modified MDI such as carbodiimide modified MDI or allophanate modified MDI; isomers of toluene-dipolyisocyanate ("TDI") such as 2, 4-TDI, 2, 6-TDI, isomers of naphthalene-dipolyisocyanate ("NDI") such as 1, 5-NDI, and mixtures and/or combinations thereof. Examples of aliphatic isocyanates suitable for use according to this disclosure include, but are not limited to, isomers of hexamethylene dipolyisocyanate ("HDI"), isomers of isophorone dipolyisocyanate ("IPDI"), isomers of xylene dipolyisocyanate ("XDI"), and combinations thereof. Preferred are aromatic isocyanate monomers.

The preferred amount of isocyanate monomer in the prepolymer reactants is, by weight based on the total weight of the prepolymer reactants, is at least 10 wt %, more preferred is at least 20 wt %, more preferred is at least 30 wt %. The preferred amount of isocyanate monomer in the prepolymer reactants is not to exceed, by weight based on the total weight of the prepolymer reactants, 80 wt %, more preferred is not to exceed 70 wt %, more preferred is not to exceed 65 wt %.

The prepolymer reactants preferably contain one or more polyester polyols. Preferred polyester polyols have a molecular weight not to exceed 4,000 g/mol. Preferred polyester polyols have a hydroxyl group functionality of at least 1.5 and not to exceed 3 (i.e., $1.5 \leq f \leq 3$). Preferably, the polyester polylol has viscosity of 2,000 mPa-s at 23° C., as measured by the method of ASTM D2196.

Polyester polyols suitable for in the prepolymer reactants are polycondensates of diols and also, optionally, higher polyols (e.g., triols, tetraols), and of dicarboxylic acids and also, optionally, polycarboxylic acids (e.g., tricarboxylic acids, tetracarboxylic acids) or hydroxycarboxylic acids or lactones. The polyester polyols can also be derived from, instead of the free polycarboxylic acids, the corresponding polycarboxylic anhydrides, or corresponding polycarboxylic esters of lower alcohols.

Suitable diols for use in making polyester polyols include, but are not limited to, ethylene glycol, butylene glycol, diethylene glycol, triethylene glycol, polyalkylene glycols, such as polyethylene glycol, and also 1, 2-propanediol, 1, 3-propanediol, 1, 3-butanediol, 1, 4-butanediol, 1, 6-hexanediol, and neopentyl glycol. In order to achieve a polyester polyol functionality greater than 2, polyols having a functionality of 3 can optionally be included in the adhesive composition (e.g., trimethylolpropane, glycerol, erythritol, pentaerythritol, trimethylolbenzene or trishydroxyethyl isocyanurate).

Suitable dicarboxylic acids for use in making polyester polyols include, but are not limited to, aliphatic acids, aromatic acids, and/or combinations thereof. Examples of suitable aromatic acids include phthalic acid, isophthalic acid, terephthalic acid, and tetrahydrophthalic acid. Examples of suitable aliphatic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. As used herein, the term "acid" also includes any anhydrides of said acid. Further, monocarboxylic acids, such as benzoic acid and hexane carboxylic acid, should be minimized or excluded from the disclosed compositions. Saturated aliphatic or aromatic acids are preferred, such as adipic acid or isophthalic acid.

The preferred amount of the polyester polyol in the prepolymer reactants is, by weight based on the total weight of the prepolymer reactants, more preferred at least 2 wt %, more preferred at least 5 wt %, more preferred at least 10 wt %. The preferred amount of the polyester polyol in the prepolymer reactants is not to exceed, by weight based on the total weight of the prepolymer reactants, 45 wt %, more preferred not to exceed 40 wt %, more preferred not to exceed 35 wt %.

The prepolymer reactants preferably include one or more polyether polyols. Preferred polyether polyols have a molecular weight not to exceed 5,000 g/mol. Preferably, the polyether polyols have a hydroxyl group functionality of at least 1.5 and not to exceed 4 (i.e., $1.5 \leq f \leq 4$). Preferred polyether polyols have viscosity of 1,000 mPa-s or less at 23° C., as measured by the method of ASTM D2196.

Polyether polyols suitable for use in the prepolymer reactants optionally are the polyaddition products of ethylene oxide, propylene oxide, tetrahydrofuran, butylene oxide, or the co-addition or grafted products thereof, as well as the polyether polyols obtained by condensation of polyhydric alcohols or mixtures thereof. Examples of polyether polyols suitable for use include, but are not limited to, polypropylene glycol ("PPG"), polyethylene glycol ("PEG"), polybutylene glycol, and polytetramethylene ether glycol ("PTMEG").

The preferred amount of the polyether polyol in the prepolymer reactants is, by weight based on the total weight of the prepolymer reactants, at least 5 wt %, more preferably at least 10 wt %, more preferably at least 25 wt %. The preferred amount of the polyether polyol in the prepolymer reactants is not to exceed, by weight based on the total weight of the prepolymer reactants, 45 wt %, more preferred not to exceed 40 wt %, more preferred not to exceed 35 wt %.

The prepolymer reactants may optionally further comprise one or more bio-based polyols, such as castor oil, one or more modified castor oil, or one or more other known bio-based polyols, or a mixture thereof. Preferred bio-based polyol has a hydroxyl group functionality of at least 1.5 and not to exceed 4 (i.e., $1.5 \leq f \leq 4$). Preferred bio-based polyols are modified castor oils.

When optionally included in the prepolymer reactants, the preferred amount of the bio-based polyol in the isocyanate component is, by weight based on the total weight of the prepolymer reactants, at least 0.3 wt %, more preferably at least 1 wt %, more preferably at least 3 wt %. When optionally included in the prepolymer reactants, the preferred amount of the bio-based polyol in the prepolymer reactants is, by weight based on the total weight of the prepolymer reactants, not to exceed 15 wt %, more preferably not to exceed 10 wt %, more preferably not to exceed 5 wt %.

Preferably, the isocyanate component has a % NCO of at least 3 wt %, more preferably at least 5 wt %, more preferably at least 7 wt %. Preferably, the isocyanate component has a % NCO not to exceed 30 wt %, more preferably not to exceed 25 wt %, more preferably not to exceed 22 wt %, more preferably not to exceed 20 wt %.

Preferably, the isocyanate component has viscosity at 25° C. of 300 mPa-s to 20,000 mPa-s, as measured by the method of ASTM D2196.

The isocyanate component can, optionally, comprise one or more catalysts. Examples of suitable include, but are not limited to, dibutyltin dilaurate, zinc acetate, 2,2-dimorpholinodiethylether, and combinations thereof.

The adhesive composition also contains a polyol component. The polyol component preferably contains a mixture of two or more polyols plus one or more phosphate functional compounds. Preferably the polyol component contains one or more polyester polyols. Preferably, the amount of all polyester polyols, by weight based on the weight of the polyol component, is 10% or more; more preferably 20% or more. Preferably, the amount of all polyester polyols, by weight based on the weight of the polyol component, is 50% or less; more preferably 40% or less.

Preferably the polyol component contains one or more poly ether polyols. Preferably, the amount of all polyether polyols, by weight based on the weight of the polyol component, is 50% or more; more preferably 60% or more. Preferably, the amount of all polyether polyols, by weight based on the weight of the polyol component, is 90% or less; more preferably 80% or less.

Preferably, the amount of phosphate functional compound is, by weight based on the weight of the polyol component, 1% or more; more preferably 2% or more. Preferably, the amount of phosphate functional compound is, by weight based on the weight of the polyol component, 15% or less; more preferably 10% or less Preferably, the weight ratio of the isocyanate component to the polyol component is 1:1 or higher, more preferably 1.5:1 or higher; more preferably 1.8:1 or higher. Preferably, the weight ratio of the isocyanate component to the polyol component is 5:1 or lower, more preferably 4.5:1 or lower, more preferably 4:1 or lower.

Preferably, the adhesive composition is solventless. As used herein, a solvent is a compound or mixture of compounds that is liquid at 25° C. and that is capable of forming a solution that has the adhesive composition dissolved in the solvent such that the amount of adhesive composition dissolved in the solvent is 10% or more by weight based on the weight of the solution. An adhesive composition is considered herein to be solventless if the total weight of all solvents in the adhesive composition is, by weight based on the weight of the adhesive composition, 10% or less. Preferably, the total weight of all solvents in the adhesive composition is, by weight based on the weight of the adhesive composition, 5% or less; more preferably 2% or less; more preferably 1% or less.

It is contemplated that the isocyanate component and the polyol component of the adhesive composition can be made separately and, if desired, stored until it is desired to use the adhesive composition. In some embodiments, both the isocyanate component and the polyol component are each liquid at 25° C. When it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

A method of forming a laminate using an adhesive composition is also disclosed. In some embodiments, the adhesive composition, such as the adhesive composition discussed above, is in a liquid state. In some embodiments, the composition is a liquid at 25° C. Even if the composition is solid at 25° C., it is acceptable to heat the composition as necessary to put it in a liquid state or, if desired, to reduce the viscosity of a liquid adhesive composition. A layer of the composition is applied to a surface of a first film. In some embodiments, the thickness of the layer of the curable mixture is 1 to 5 micrometer.

In some embodiments, a surface of a second film is brought into contact with the layer of the curable mixture to form an uncured laminate. Preferably, the uncured laminate is made at a time when the amount of unreacted polyisocyanate groups present in the adhesive composition is, on a molar basis compared to the amount of polyisocyanate groups present in the isocyanate component prior to contact with the polyol component, more preferably at least 50%, more preferably at least 75%, more preferably at least 90%. Preferably, uncured laminate is made at a time when the amount of unreacted polyisocyanate groups present in the curable mixture is less than 100%, more preferably less than 97%, more preferably less than 95%.

The curable mixture is then cured or allowed to cure. The uncured laminate may be subjected to pressure, for example by passing through nip rollers, which may or may not be heated. Films optionally have a surface on which an image is printed with ink; the ink may be in contact with the adhesive composition.

The composition of the first film comprises polyethylene terephthalate (PET). The PET may be a homopolymer, in which all the polymerized units have structure II, or the PET may be copolymer, in which some polymerized units have structure other than structure II. Some suitable comonomers are, for example, monoesters of a diacid and a glycol, in which either the diacid is different from terephthalic acid, or the glycol is different from ethylene glycol, or both the diacid is different from terephthalic acid and the glycol is different from ethylene glycol. Some suitable diacids include, for example, phthalic acid, isophthalic acid, and mixtures thereof. Some suitable glycols include, for example, olefin glycols other than ethylene glycol. Preferably, the amount of polymerized units in the PET that have structure II is, by weight based on the weight of the PET, 75% or more; more preferably 85% or more; more preferably 95% or more.

Preferably, the amount of PET in the first film is, by weight based on the weight of the first film, 60% or more; more preferably 80% or more; more preferably 90% or more; more preferably 95% or more.

The second film comprises polyethylene (PE). The PE may be linear or branched. The PE may be chlorinated, sulfonated, and/or crosslinked. Preferably, the PE is not chlorinated. Preferably, the PE is not sulfonated. Preferably, the PE is not crosslinked.

The PE may be a homopolymer, in which all the polymerized units have structure I, or the PE may be a copolymer. Suitable comonomers include, for example, unsaturated olefins other than ethylene, including dienes, and unsaturated esters. Unsaturated esters have the structure $R^1$—C(O)O—$R^2$, where one or both of $R^1$ and/or $R^2$ contains a carbon-carbon double bond. Some suitable unsaturated esters include, for example, vinyl esters, acrylics, and mixtures thereof. Vinyl esters contain one or more carbon-carbon double bond in $R^1$ and include, for example, vinyl acetate. Acrylics have one or more carbon-carbon double bond in $R^2$ and include, for example, acrylic acid, methacrylic acid, alkyl esters of acrylic acid or methacrylic acid, and mixtures thereof. Preferably, the amount of polymerized units in the PE that have structure I is, by weight based on the weight of the PE, 75% or more; more preferably 85% or more; more preferably 95% or more.

Preferably, the amount of PE in the second film is, by weight based on the weight of the second film, 50% or more; more preferably 75% or more; more preferably 90% or more; more preferably 95% or more.

Figure 1:
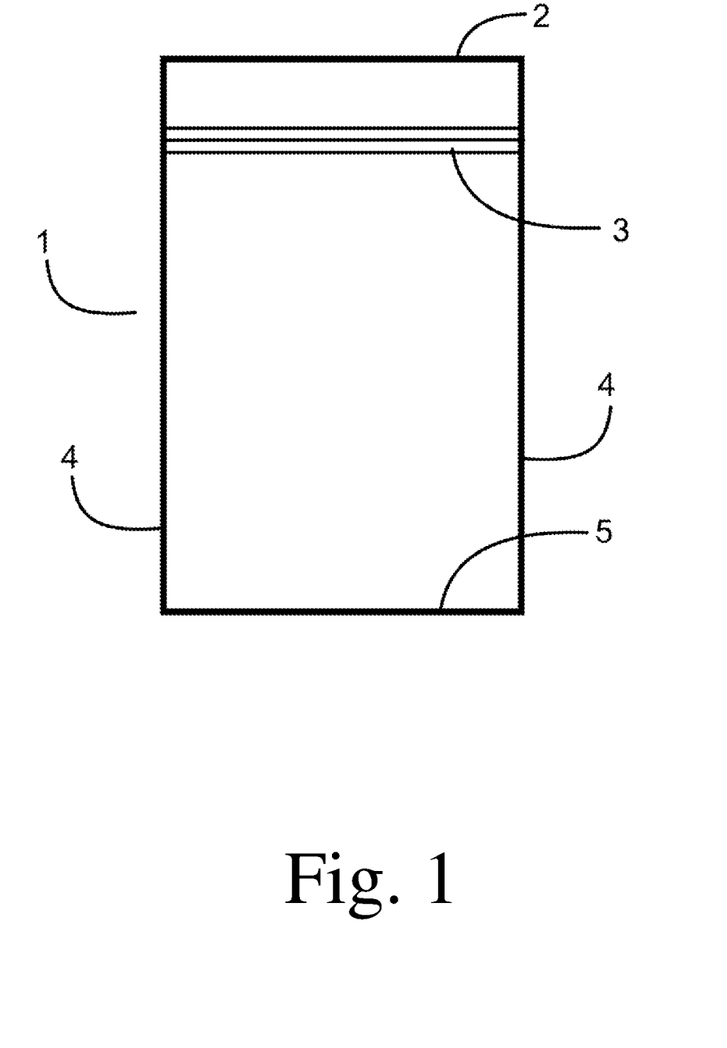
FIG. 1 is a top view of one embodiment of a zipper pouch according to the present invention.

The laminate is used in making a zipper pouch. A zipper pouch may have any shape. The zipper pouch comprises a zipper construction that allows the pouch to be opened and closed multiple times. One embodiment of a zipper pouch 1 is shown in FIG. 1. In the embodiment shown, the zipper pouch has an opening 2 along the top edge; the sides 4 and the bottom 5 are sealed; and the pouch may be opened and then closed using the zipper construction 3. One suitable method of making the embodiment shown is to form two rectangles of identical dimensions of the laminate of the present invention, as described above. The two rectangles may have identical composition or may be different. Preferably the two rectangles have the same composition as each other. The two rectangles may be brought into contact with all the edges of one rectangle lying against the edges of the other rectangle; then the sides 4 and the bottom 5 may be sealed, for example by heat sealing; then a zipper construction may be placed between the two rectangles of laminate and then bonded into place, for example by application of heat and pressure.

Figure 2:
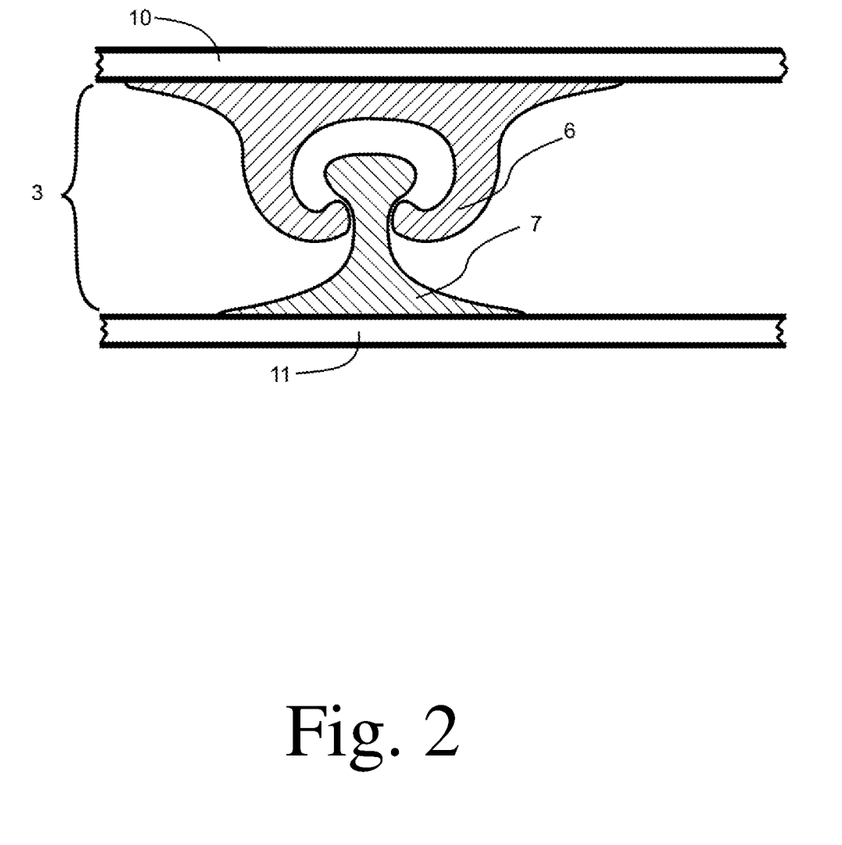
FIG. 2 is a cross section of the zipper construction of one embodiment of a zipper pouch according to the present invention.

FIG. 2 shows a cross section of the pouch 1 and shows one embodiment of a zipper construction 3. The zipper construction 3 is located between an upper layer 10 of laminate and a lower layer 11 of laminate. The zipper construction 3 comprises a pocket 6 and a rail 7. In some embodiments, the pocket 6 is extruded, and the rail 7 is also extruded, with the direction of extrusion being perpendicular to the plane of FIG. 2. The rail 7 and the pocket 6 may each independently have uniform composition, or the composition of either or both of the pocket 6 and the rail 7 may vary in the direction of extrusion. Preferably, the rail is sufficiently rigid, and the pocket is sufficiently flexible, that the rail may be pulled out of the pocket and then re-inserted into the pocket with only hand pressure, and these operations may be performed multiple times without damage to the zipper construction. The pocket is bonded to the top laminate 10, and the rail is bonded to the bottom laminate 11.

In some embodiments, the zipper construction will comprise two or more rail-and-pocket constructions, with the rails parallel to each other. In some embodiments, the bottom 5 of the pouch will have additional laminate material (not shown) bonded to the top laminate 10 and the bottom laminate 11 to form a gusset that allows the pouch to stand upright with the gusseted bottom 5 resting on a horizontal surface.

Regardless of other details of how the zipper pouch is constructed, the step of bonding the zipper construction to the laminate is preferably conducted by applying pressure to force the zipper construction against the laminate while exposing the assembly thus formed to temperatures of 200° C. or higher; more preferably 220° C. or higher; more preferably 240° C. or higher. The zipper construction may be bonded to both the top laminate and the bottom laminate at the same time, or the zipper construction may be bonded to first one laminate and then the other.

The following are examples of the present invention. Operations were performed at room temperature (approximately 23° C.) except where otherwise stated.

Lamination was done manually using a K-bar coater and a hot roll laminator.

Processing conditions for laminating with solvent-based adhesives (adhesives having more than 10% solvent by weight) were as follows. Adhesive was coated on printed PET, and then laminated with PE; after that it was dried out immediately by hot air gun (temperature 60-80° C.) and laminated using hot roll laminator, and then cured at room temperature (25-35° C.) for 24 hours. Adhesive coat weight obtained was 1.9+/−0.2 grams per square meter (GSM). Lamination was done at Nip roll temperature of 60° C. Nip pressure was 4.0 bar, and nipping speed was at a machine setting of 5.0.

Processing conditions for laminating with solventless adhesives were as follows. The isocyanate component and polyol component were warmed up in separate reservoirs of the metering mixing dispenser (isocyanate at 48° C., polyol at 38° C.). Then the adhesive was transported via heated hose pipe (40° C.) to a static mixer whereby the isocyanate and polyol were mixed homogenously before the resulting mixture was dispensed between the heated adhesive dam metering rollers. The warmed adhesive was coated on film using the coating roller, subsequently nipped (laminated) with another roll of film at the heat nip roll. Adhesive was coated on printed PET, and then laminated with PE, and cured at hot room condition 50° C. Metering roller were at −40° C., and coating roller was at 47° C., and the Laminating Nip was at 50° C. Mixing ratio of isocyanate component to polyol component was 100 parts by weight isocyanate component to 42 to 43 parts by weight polyol component. When the PE was 80 micrometers thick, coat weight was 1.9 to 2.1 GSM; when 130 micrometers thick, coat weight was 2.2 to 2.4 GSM.

Laminates that were to be used for laboratory testing in the form of laminate sheets were allowed to stand for 24 hours at 50° C. before testing. Those laminates that were to be made into pouches were allowed to stand for 4 days at 50° C. prior to being made into pouches.

Laminates were tested as follows.

Bond Strength: To determine the bond strength, 15 mm or 25 mm wide strips of the test laminate are cut. These strips are dipped in Ethyl Acetate solvent where the adhesive dissolves. These strips are then separated and the said sample tested on the Universal Testing machine (UTM). The maximum force required to separate the two layers is known as bond strength. Test Condition: 25 mm Jaw length, test speed 100 mm/minute, test unit: Grams/15 mm or 25 mm width, at ambient condition.

Seal Strength: 15 mm or 25 mm wide strips of the test laminate are cut. These strips are tested on the Universal Testing machine (UTM). The maximum force required to break the specimen is known as seal strength. Test Condition: 25 mm Jaw length, test speed 150 mm/minute, Test Unit: Kg/15 or 25 mm, pressure: 3.0 kg/cm$^2$, Temperature: 150° C.

Heat Resistance Test: rectangular strips are cut, approximately 100 to 150 mm on each side. Laminates are subjected to heat sealing jaw of the sealing machine from 150° C. increasing by 10° C. up to 260° C. or till the time the laminate ruptures. It is then visually observed for piping/tunnelling/Blistering or other physical deformity. Test Condition: 0.5-1.0 second dwell time, 3.0 kg/cm2 pressure. Ambient condition (25 to 35° C.). Samples without physical deformity are said to "pass." The highest temperature at which the laminate passes is reported.

The materials used were as follows. Adhesives with label ending in "C" are comparative. "Adh." means "Adhesive." "Promoter" means "Adhesion promoter." "Phos?" means "Is there phosphate functional compound in the polyol component?"

| Adh | Isocyanate component | polyol component | Phos? | solvent wt % | promoter |
|---|---|---|---|---|---|
| A1 | PACACEL ™ 968[1] | PacAcel ™ C108[1] | yes | none | non-Si |
| A2C | MORFREE ™ MF698A[1] | MORFREE ™ C411[1] | no | none | non-Si |
| A3C | MORFREE ™ 899[1] | MORFREE ™ C99[1] | no | none | non-Si |
| A4C | ADCOTE ™ Cat-F[1] | ADCOTE ™ 545EA[1] | no | >20% | non-Si |
| A5C | ADCOTE ™ Cat-F[1] | ADCOTE ™ 811A[1] | no | >20% | Si |
| A6C | Henkel 1511A[2] | Henkel 2511[2] | no | >20% | unknown |
| A7C | Henkel 7720[2] | Henkel 6028[2] | no | none | unknown |
| A8C | CA-7918[3] | SF-7660[3] | no | none | unknown |

[1]Dow Chemical Company
[2]Henkel Corporation
[3]Coim Company (weight ratio of isocyanate component to polyol component is 0.7:1)

It is believed that none of the comparative adhesives A6C, A7C, or A8C contain a phosphate functional compound. In all of the examples A1, A2C, A3C, A4C, A5C, A6C, and A7C, the weight ratio of isocyanate component to polyol component was 1:1 or greater.

A first test was conducted using PET 12 micrometers thick and PE 130 micrometers thick. Samples were cured for 48 hours at ambient conditions (25 to 30° C.). Bond strength samples were 15 mm wide.

TABLE 1

| | Results of First Test | | |
|---|---|---|---|
| Example | Bond Strength (g) | Seal Strength (kg) | Heat Resistance |
| A1 | 550-657 | 5.5-6.3 | 260° C. |
| A2C | 468-531 | 5.4-5.9 | 240° C. |
| A3C | 400-439 | 4.7-4.9 | 220° C. |

TABLE 1-continued

| | Results of First Test | | |
|---|---|---|---|
| Example | Bond Strength (g) | Seal Strength (kg) | Heat Resistance |
| A4C | 550-590 | 5.5-5.8 | 260° C. |
| A5C | 610-645 | 5.8-6.4 | 260° C. |

The results show that the working example of the present invention, A1, performs better in all measures than the solventless comparative samples A2C and A3C. Only the solvent-based samples A4C and A5C performed as well or better than working example A1.

A second test was performed, using PE of different thicknesses. PET was printed, and PE was white, with thickness 12 micrometers. Test strips were 15 mm wide. "Str" means "strength." "CF" means "cohesive failure." "PT" means "PET Tear," which indicates the mode of failure during the bond strength test. "ND" means "not tested."

TABLE 2

| | Strength Results of Second Test | | | |
|---|---|---|---|---|
| | PE: 80 micrometers | | PE: 130 micrometers | |
| Example | Bond Str (g) | Seal Str (kg) | Bond Str (g) | Seal Str (kg) |
| A6C | 406-432 CF | 5.0-5.2 | 420-448 CF | 5.4-5.8 |
| A3C | 331-360 CF | 4.4-4.8 | 370-421 CF | 4.5-4.7 |
| A2C | 421-435 CF | 4.8-5.2 | 410-423 CF | 5.2-5.8 |

TABLE 2-continued

| | Strength Results of Second Test | | | |
|---|---|---|---|---|
| | PE: 80 micrometers | | PE: 130 micrometers | |
| Example | Bond Str (g) | Seal Str (kg) | Bond Str (g) | Seal Str (kg) |
| A1 | 505-523 CF | 5.7-6.2 | 530-577 CF | 6.0-6.6 |
| A7C | 339-367 CF | 4.6-4.8 | 390-438 CF | 4.7-4.8 |
| A8C | 430-435 CF | 5.0-5.2 | ND | ND |
| A5C | 590-625 CF | 5.8-6.4 | 598-605 PT | 5.8-6.7 |

The samples from the second test were also tested for heat resistance. At each test temperature, the laminate was observed and given a rating from 1 (poor) to 5 (excellent).

TABLE 3

Heat Resistance Results of Second Test (ratings)

| | PE: 80 micro-meters | | | PE: 130 micro-meters | | |
|---|---|---|---|---|---|---|
| Example | 220° C. | 240° C. | 260° C. | 220° C. | 240° C. | 260° C. |
| A6C | 5 | 5 | 4 | 5 | 5 | 4 |
| A3C | 5 | 3 | 3 | 5 | 3 | 2 |
| A2C | 5 | 5 | 3 | 5 | 5 | 3 |
| A1 | 5 | 5 | 5 | 5 | 5 | 5 |
| A7C | 5 | 3 | 3 | 5 | 3 | 2 |
| A8C | 5 | 4 | 4 | nd | nd | nd |
| A5C | 5 | 5 | 5 | 5 | 5 | 5 |

The results in Tables 2 and 3 show that A1, the working example of the present invention, performs better in all tests than all the other samples except for ASC, which is a solvent-based adhesive. That is, A1 performs better than all of the other solventless adhesives.

Two of the laminate samples from the second test were subjected to gas chromatography to determine the amount of solvent retained in the laminate. Four replicate tests were performed on each sample, and the average is reported below.

TABLE 4

Solvent Retention by Gas Chromatography

| Example | solvent concentration (mg/meter$^2$) |
|---|---|
| A1 | 2.3 |
| A6C | 5.2 |

The results in table 4 show that A1, the solventless adhesive, leads to laminates with far less residual solvent than A6C, which is a solvent based adhesive.

The invention claimed is:

1. A process for preparing a zipper pouch, wherein the process comprises:
   A) forming a first laminate by a process comprising
      i) bringing together a polyisocyanate component and a polyol component to form a solventless adhesive composition having 0 wt % solvent,
         wherein the polyisocyanate component comprises a polyisocyanate prepolymer comprising
         (a) an isocyanate monomer, and
         (b) a polyester polyol formed from
            diethylene glycol,
            adipic acid, and
            neopentyl glycol, and
         wherein the polyol component comprises 1% to 15% by weight, based on the weight of the polyol component, of a phosphate functional compound,
         wherein the adhesive composition comprises a weight ratio of the polyisocyanate component to the polyol component from 1.5:1 to 4.5:1,
      ii) applying a layer of the adhesive composition to a layer of polyethylene terephthalate,
      iii) then contacting the layer of the adhesive composition with a layer consisting of polyethylene and having a thickness of 80 micrometer or more,
   B) contacting a polymeric zipper construction comprising a pocket and a rail to the first laminate at temperature of 200° C. or higher.

2. The process of claim 1, wherein the polyol component additionally comprises from 10% to 50% by weight, based on the weight of the polyol component, of one or more polyester polyol and 50% to 90% by weight, based on the weight of the polyol component, of one or more polyether polyol.

3. The process of claim 2, wherein the process comprises an additional step of contacting the zipper construction to a second laminate at a temperature of 200° C. or higher, wherein the second laminate is formed by a process comprising the steps
   i) bringing together a polyisocyanate component and a polyol component to form a solventless adhesive composition,
      wherein the polyisocyanate component comprises the polyisocyanate prepolymer, and
      wherein the polyol component comprises 1% to 15% by weight, based on the weight of the polyol component, of a phosphate functional compound,
      wherein the adhesive composition comprises a weight ratio of the polyisocyanate component to the polyol component from 1.5:1 to 4.5:1,
   ii) applying a layer of the adhesive composition to a layer of polyethylene terephthalate,
   iii) then contacting the layer of the adhesive composition with a layer consisting of polyethylene having thickness of 80 micrometer or more,
      wherein the second laminate may have the same composition as the first laminate or may have a different composition from the first laminate.

4. A zipper pouch made by the process of claim 1.

5. The process of claim 1, wherein the polyester polyol has a molecular weight not to exceed 4,000 g/mol.

6. The process of claim 5, wherein the isocyanate monomer is an aromatic isocyanate.

7. The process of claim 1 wherein the layer consisting of polyethylene is a monolayer film.

8. The process of claim 7 wherein the layer of polyethylene terephthalate consists of polyethylene terephthalate.

9. A process for preparing a zipper pouch, wherein the process comprises:
   A) forming a first laminate by a process comprising
      i) bringing together a polyisocyanate component and a polyol component to form a solventless adhesive composition having 0 wt % solvent,
         wherein the polyisocyanate component comprises a polyisocyanate prepolymer that is the reaction product of
         (a) an isocyanate monomer, and
         (b) a polyester polyol formed from
            diethylene glycol,
            adipic acid, and
            neopentyl glycol, and
         wherein the polyol component comprises 1% to 15% by weight, based on the weight of the polyol component, of a phosphate functional compound,
         wherein the adhesive composition comprises a weight ratio of the polyisocyanate component to the polyol component from 1.5:1 to 4.5:1,
      ii) applying a layer of the adhesive composition to a first film of polyethylene terephthalate,
      iii) then contacting the layer of the adhesive composition with a second film that is a monolayer film consisting of polyethylene,
   B) contacting a polymeric zipper construction comprising a pocket and a rail to the first laminate at temperature of 200° C. or higher.

10. The process of claim 9 wherein the second film has a thickness of 80 micrometers or more.

11. The process of claim 10 wherein the second film has a thickness of 130 micrometers.

12. The process of claim 9, wherein the polyol component additionally comprises from 10% to 50% by weight, based on the weight of the polyol component, of one or more polyester polyol and 50% to 90% by weight, based on the weight of the polyol component, of one or more polyether polyol.

13. The process of claim 9, wherein the process comprises an additional step of contacting the zipper construction to a second laminate at a temperature of 200° C. or higher, wherein the second laminate is formed by a process comprising the steps
   i) bringing together a polyisocyanate component and a polyol component to form a solventless adhesive composition,
      wherein the polyisocyanate component comprises the polyisocyanate prepolymer, and
      wherein the polyol component comprises 1% to 15% by weight, based on the weight of the polyol component, of a phosphate functional compound,
      wherein the adhesive composition comprises a weight ratio of the polyisocyanate component to the polyol component from 1.5:1 to 4.5:1,
   ii) applying a layer of the adhesive composition to a third film of polyethylene terephthalate,
   iii) then contacting the layer of the adhesive composition with a fourth film that is a monolayer film consisting of polyethylene,
      wherein the second laminate may have the same composition as the first laminate or may have a different composition from the first laminate.

14. The process of claim 13 wherein the fourth film has a thickness of 80 micrometers or more.

15. The process of claim 13 wherein the fourth film has a thickness of 130 micrometers.

* * * * *